United States Patent [19]
Kuhlman

[11] 3,980,235
[45] Sept. 14, 1976

[54] FOOD CUTTING APPARATUS

[76] Inventor: Harvey G. Kuhlman, N56 W21466 Silver Spring Road, Menomonee Falls, Wis. 53051

[22] Filed: Nov. 6, 1974

[21] Appl. No.: 521,270

[52] U.S. Cl. .............................. 241/84; 241/152 A; 241/135; 83/431
[51] Int. Cl.² ........................................ B02C 19/00
[58] Field of Search ................ 426/518; 241/83, 84, 241/95, 152 R, 152 A, 134, 135; 83/425.3, 431, 437, 651.1

[56] References Cited
UNITED STATES PATENTS

| | | | |
|---|---|---|---|
| 3,187,432 | 6/1965 | Cuomo | 83/431 X |
| 3,565,145 | 2/1971 | Sanders et al. | 83/425.3 |
| 3,888,428 | 6/1975 | Tabernacki | 241/152 A |
| R26,796 | 2/1970 | Lamb | 426/518 X |

Primary Examiner—Granville Y. Custer, Jr.
Attorney, Agent, or Firm—Andrus, Sceales, Starke & Sawall

[57] ABSTRACT

A cheese cubing apparatus divides blocks of cheese into relatively small cubes which are then shredded for depositing on pizza crusts. A pair of parallel inclined conveyors having similarly opposed cutters secured to the upper end. Each conveyor is driven by a hydraulic motor in a timed manner to locate the cheese block and to then hesitate. A laterally extending hydraulic piston unit forces the cheese block outwardly through a stationary cutting element defined by spaced wires in the discharge path to form cubes which drop into the cheese shredders mounted therebetween. Each conveyor has a belt formed of stainless steel slats interconnected by suitable pin means and spaced plates to carry the cheese blocks. Conveyor sidewalls are releasably secured to a box-like frame and to each other to permit ready exposure of the operating components for cleaning. Each of the shredders includes a rotating support disc with an apertured basket releasably secured thereto. A plurality of circumferentially spaced cutter arms rotate oppositely within the basket and force the cheese cubes out the basket to shred the cheese. An outer encircling wall is releasably hung upon the main framework by a pin and cylinder coupling. A chute member has a lower circle base which rests on the upper end of the tubular wall and is clamped in position by a suitable latch member. An additional outer baffle is hung on the framework and encircles the lower end of the cutter to maintain complete enclosure of the shredded material as it drops.

24 Claims, 9 Drawing Figures

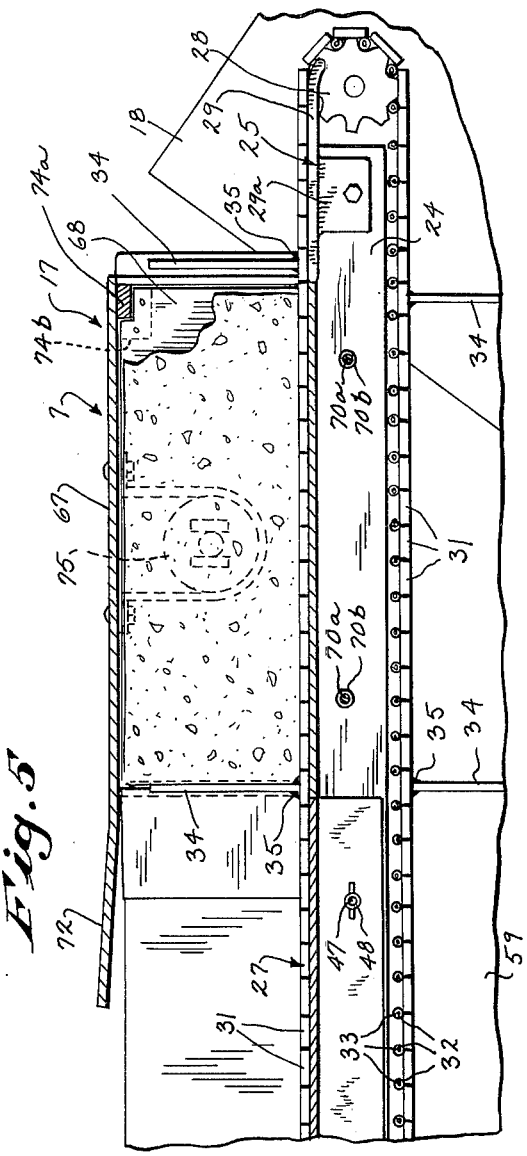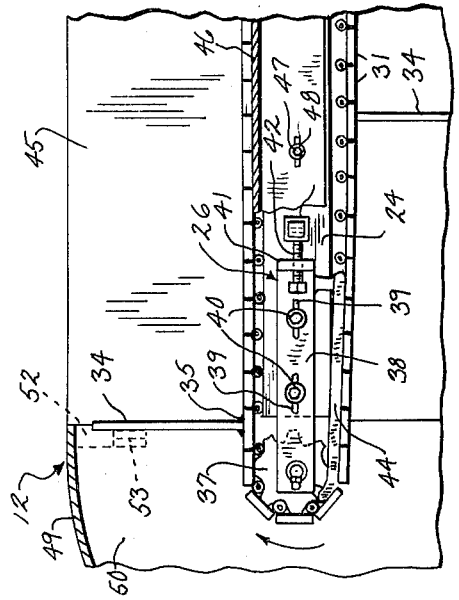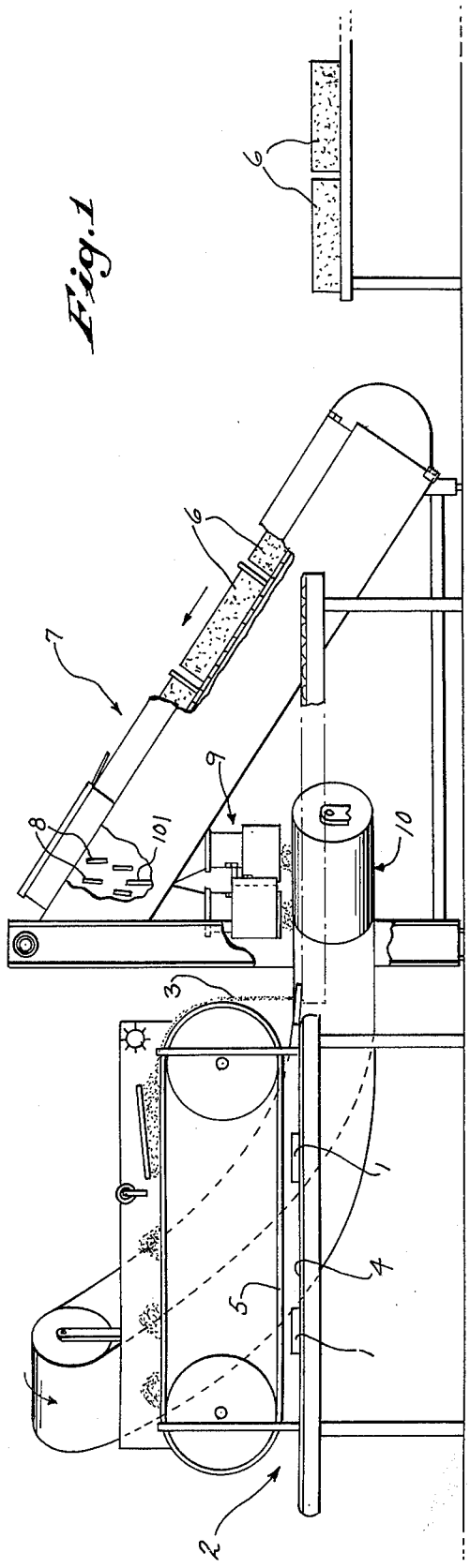

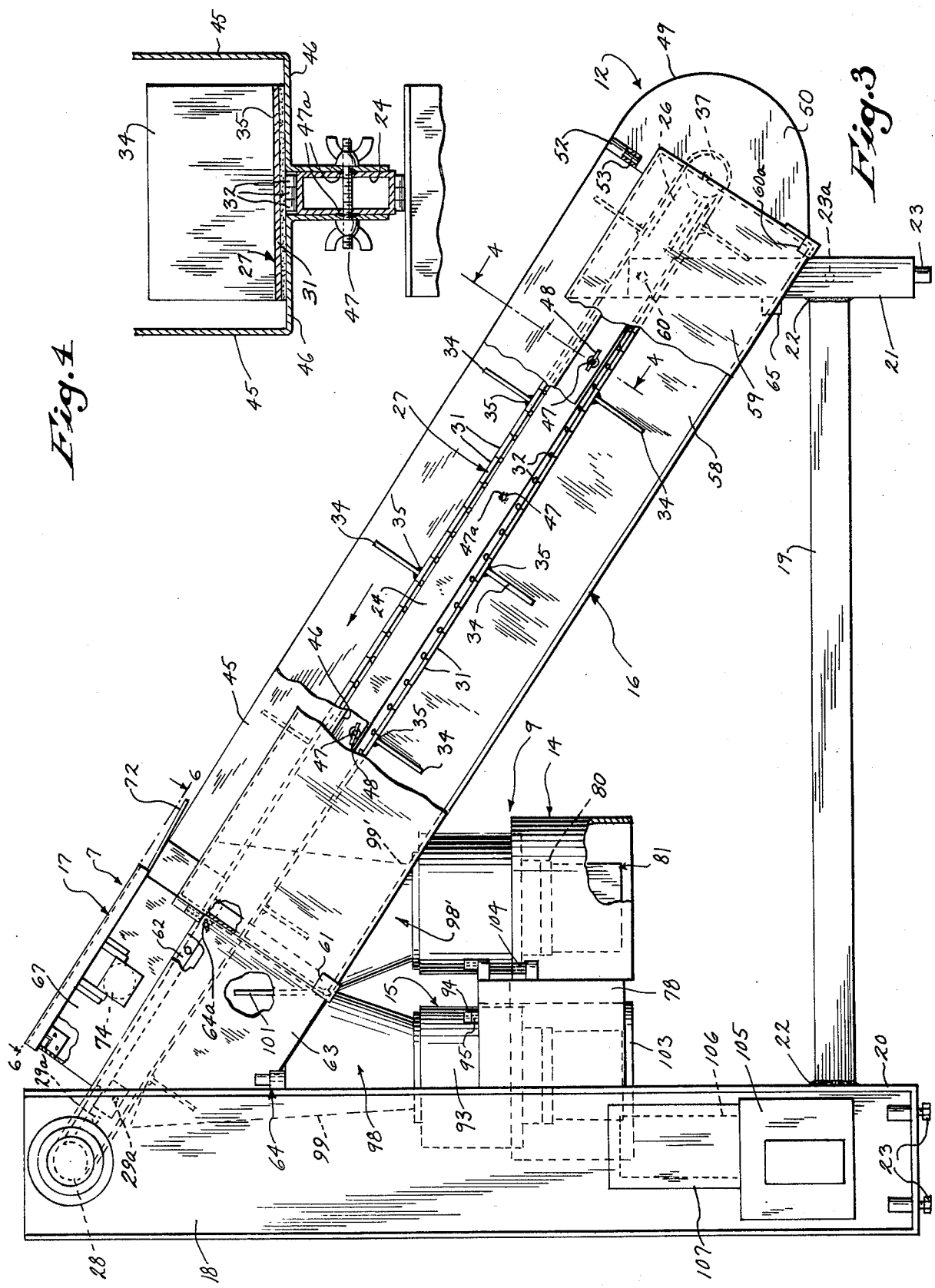

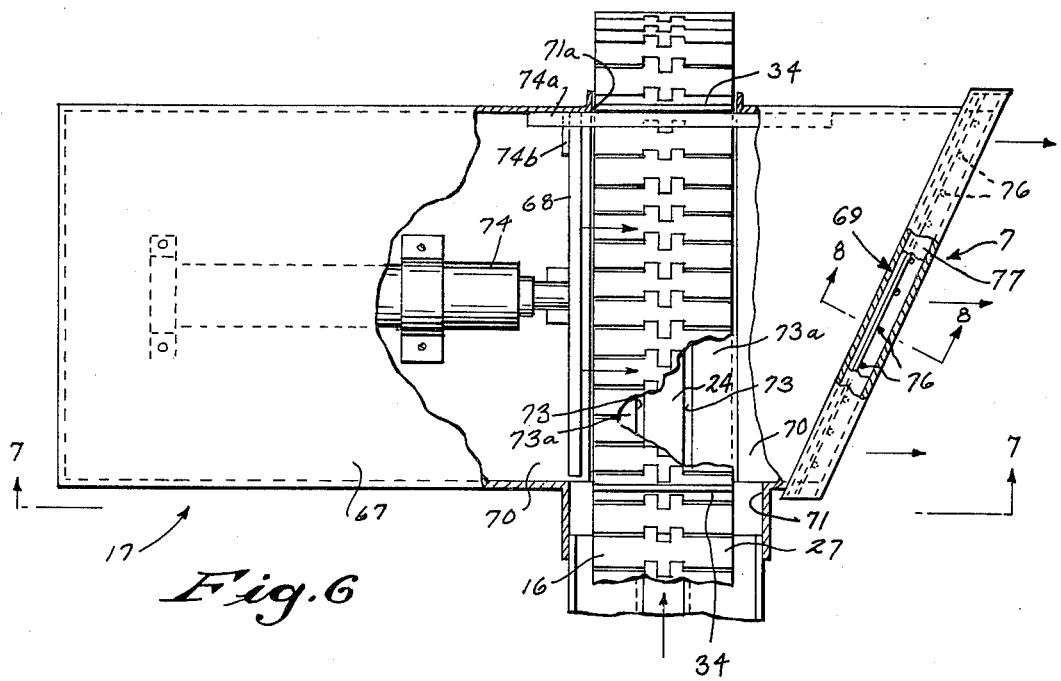
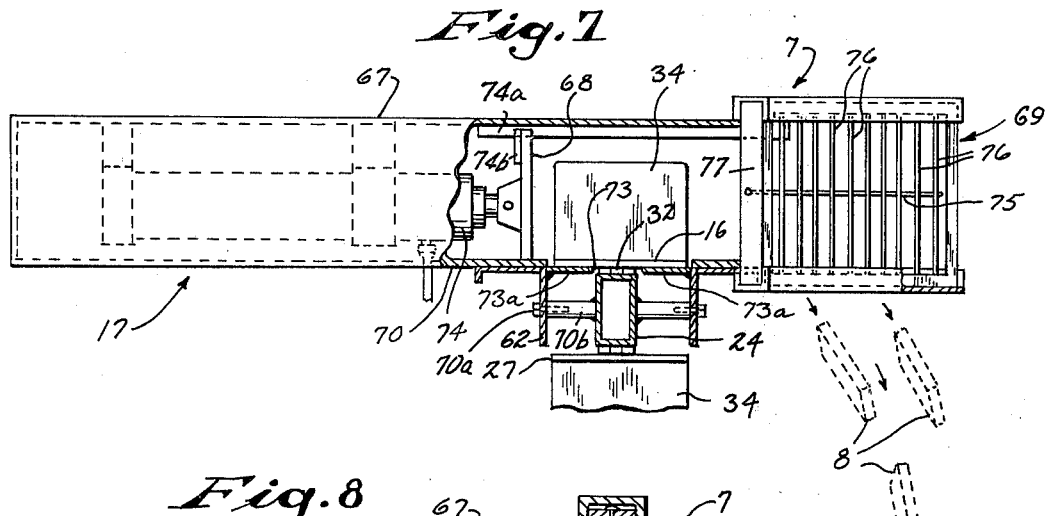
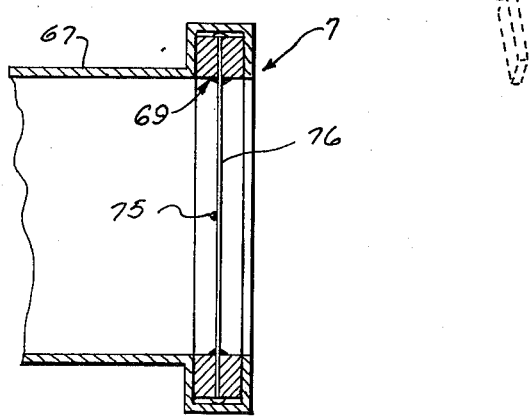

FOOD CUTTING APPARATUS

BACKGROUND OF THE INVENTION

This invention relates to a food cutting apparatus and particularly to apparatus for dividing a block of cheese into a plurality of relatively small chunks suitable for grating.

The mass marketing of various food products has resulted in development of automatic food forming apparatus. For example, pizzas which are mass marketed may advantageously be constructed with various automatic machinery. A highly satisfactory automated system is disclosed in Applicant's recently issued U.S. Pat. No. 3,779,205, which generally discloses an in-line processing line including means for delivering blocks of cheese to an automatic slicer which divides the block into a plurality of smaller pieces which are fed to a power-driven shredder. The shredded cheese is fed to an automatic depositing apparatus for depositing of the grated cheese upon the crust or dough bases in combination with automatic apparatus for depositing of meat, sauce and the like. Such a structure may provide a high speed, mass production of pizzas which are frozen and then shipped to various marketing outlets. The automated forming not only improves the quality of the product but significantly reduces the per unit cost.

In all of such automatic apparatus, very stringent requirements are established with respect to the construction of the apparatus to ensure high degrees of sanitary conditions. Generally, the apparatus will be made of stainless steel and must be made to permit convenient, complete cleaning of the apparatus.

The cheese cutting and grating or shredding means must correspondingly be constructed to permit complete and reliable cleaning. A practical, automated apparatus has not been commercially available which has a large capacity and a convenient construction suitable for high level sanitary application.

SUMMARY OF THE PRESENT INVENTION

The present invention is particularly directed to a food cutting apparatus and particularly to a high speed apparatus for cutting blocks of cheese or the like into relatively small chunks or cubes for subsequent shredding and delivering of the shredded material to a discharge means for subsequent processing. Generally, in accordance with the present invention, successive cheese blocks are delivered through an inclined conveyor to a cheese cutter mounted at the upper end of the conveyor. The conveyor is driven by a hydraulic motor in a timed manner to locate the cheese block and to then hesitate. The cutting means includes a hydraulically driven means such as a laterally extending piston unit for forcing of the cheese block outwardly through a stationary cutting means, which, in one aspect, includes wires spaced across a discharge path and which automatically sever the cheese block into similar small blocks or cubes for delivery into a shredder and delivered to a suitable outgoing conveyor or other transfer processing means. Generallly, in accordance with a particularly practical aspect of the present invention, a pair of side-by-side inclined conveyor means having similarly opposed cutting means secured to the upper end with the conveying means passing therethrough to deliver the cheese blocks into the corresponding cutting means. The cheese blocks are cubed and delivered to a plurality of shredders located therebetween. The conveyors operate alternately and maintain a continuous supply of cheese cubes to the shredders. The conveyors, cutting, and shredding apparatus is further hydraulically driven through a completely closed hydraulic system. The total system is, therefore, adapted to be readily washed without danger to the operating mechanism. Further, the conveyor and the shredding mechanisms are especially constructed with a plurality of manually separable covers and operating mechanism to permit rapid and convenient separation of the several elements including the outer enclosure walls for convenient, rapid and thorough cleaning of the apparatus.

More particularly, in accordance with a particularly unique construction and features of the present invention, a pair of identical inclined conveyors are secured within a supporting framework in slightly laterally spaced relation. A pair of automatic grating devices are mounted therebetween upon the framework. The conveyors include a conveyor belt formed of stainless steel slats interconnected by suitable pin means. Spaced plates or flights are secured to the slats to define a plurality of block receiving supports. The conveyor belt is mounted about a mounting frame member having a box section and secured at the upper and lower end to the framework. A pair of sidewalls are secured to the box-like member and includes sidwalls extending upwardly beyond the upper run of the belt to provide confining walls for the cheese blocks. The releasable mounting of the sidewalls includes studs secured to the box section and welded to maintain a complete enclosure thereof. The lower end of the belt includes an adjustable means for varying the length and tension of the belt for convenient removal. The belt structure passes upwardly through the discharge end of a cheese cuber including a rectangular housing extending across the belt with lateral sidewall openings through which the upper run of the belt moves to locate cheese blocks within the housing. The housing opens laterally between the conveyors and a piston plunger is located within the outer lateral portion of the housing. The conveyor belt is stopped after locating a block aligned with the plunger which is then moved outwardly to force the cheese block through the discharge opening. A plurality of parallel, vertical are secured across the face of the discharge opening and automatically sever the block into a plurality of relatively small cubes which drop downwardly into a pair of shredders. The conveyor mechanism further includes oppositely located sidewalls releasably secured through hanging type arrangements to the opposite sides of the conveyor to completely enclose the opposite sidewalls of the conveyor belt. The lower end is convered by a curved enclosure member having an outer peripheral wall and laterally outer wall means.

The pair of shredders are mounted within the framework immediately beneath and between the upper end of the cheese cutters. Each of the shredders is similarly constructed and includes a rotating support disc coupled to a hydraulic motor. A rotating basket is releasably secured to the disc as by a pin and slot connection which projects upwardly therefrom. A cutter member is releasably secured to an internal rotating drive shaft with a plurality of circumferentially spaced cutters such that the rotation of the basket results in an automatic grating of the cheese as it is fed into the periphery by the plurality of cutter members. The shredded cheese drops downwardly from the cutting mechanism around the outside of the basket onto a suitable transfer means.

An outer tubular wall encircles the basket and is releasably hung upon the main framework for convenient removal as by a pin and cylinder coupling. A chute member has a lower circle base which rests on the upper end of the tubular wall and is clamped in position by a suitable latch member.

An additional outer baffle is hung on the framework and encircles the lower end of the cutter to maintain complete enclosure of the material as it drops from the shredders onto the transfer unit.

The pair of shredders are similarly constructed in back-to-back relation between the two conveyor mechanisms with a movable divider unit located between the two chutes to selectively direct the cheese cubes as they are fed from the two cutter mechanism into the devices.

The framework, the conveyor, the cutters and the associated covering mechanisms are all formed of a suitable stainless steel such that the total mechanism can be washed down directly. The releasable hing-type drop-in type connection permits the rapid and complete cleaning of the mechanism in a very rapid and reliable manner.

The present invention has been found to provide a highly reliable food cutting apparatus which can be practically applied to high speed cutting and shredding of cheese for automated pizza making apparatus and the like.

BRIEF SUMMARY OF THE DRAWINGS

The drawings furnished herewith illustrate the best mode presently contemplated for carrying out the invention and described hereinafter.

In the drawings:

FIG. 1 is a diagrammatic illustration of a portion of a pizza-forming production line for forming and applying of shredded cheese to pizza bases;

FIG. 3 is a side elevational view of the cube cheesing apparatus shown in FIG. 1;

FIG. 4 is a sectional view taken generally on line 4 — 4 of FIG. 3;

FIG. 5 is an enlarged side elevational view taken generally on line 5 — 5 of FIG. 2 and more clearly illustrating the chain conveyor construction;

FIG. 6 is an enlarged top elevational view of the cutter apparatus with parts broken away and sectioned to more clearly illustrate details of the construction;

FIG. 7 is a view taken generally on line 7 — 7 of FIG. 6;

FIG. 8 is a vertical section taken on line 8 — 8 of FIG. 6; and

DESCRIPTION OF THE ILLUSTRATED EMBODIMENT

Figure 2:
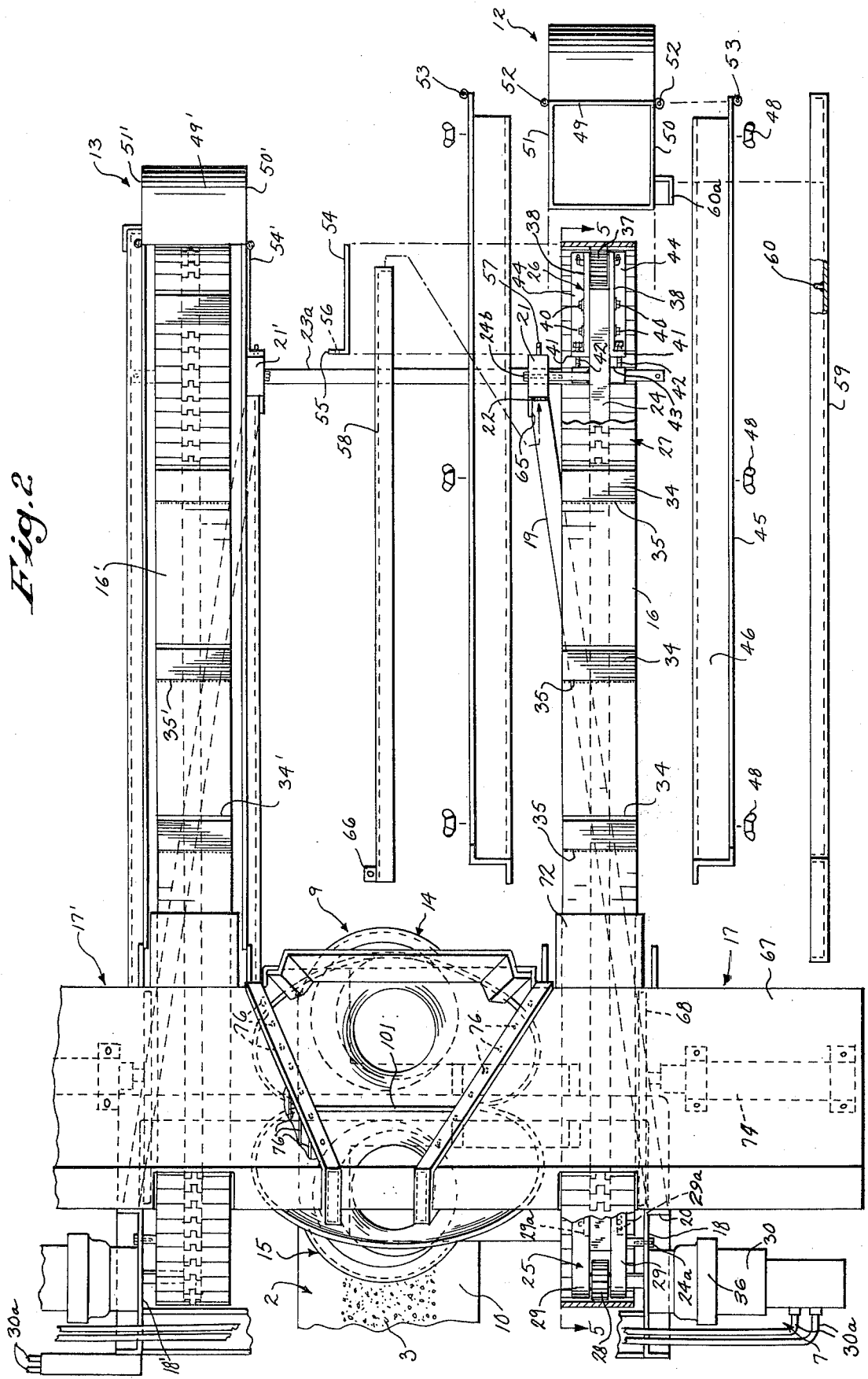
FIG. 2 is a top elevational view of a cheese cutting apparatus constructed in accordance with the present invention.

Referring to the drawings and particularly to FIG. 1, the present invention is shown applied to an automated production line for forming of pizzas 1. In the illustrated embodiment, only the cheese applicator or depositor 2 for applying of the shredded cheese 3 in accordance with the illustration in previously referred to U.S. Pat. No. 3,779,205 is shown. Generally the cheese depositor 2 includes a supporting belt conveyor 4 which supports a plurality of the pizza units 1 for movement beneath a shredded cheese metering belt conveyor 5 for the accurate depositing of the shredded cheese 3 upon the pizza units 1. The shredded cheese 3 originates from relatively large cheese blocks 6, which, in commerical practice, will be forty pound blocks having a length of approximately slightly less than twenty-one inches and a width of slightly less than nine inches. The cheese blocks 6 are fed into a grating apparatus including a cubing means 7 to form relatively small cheese cubes 8 which are fed to a shredder assembly 9 to form the shredded cheese 3. In the illustrated embodiment of the invention, a transfer conveyor 10 carries the shredded cheese 3 to the depositing apparatus 2 generally as shown in the previously referred to patent. The present invention is particularly directed to the shredding apparatus and particularly units 7 and 9. The other components may take any suitable or desired construction and thus no further description thereof is given other than in reference with the detailed description of the illustrated embodiment of the present invention.

Generally, in the illustrated embodiment of the invention, the cubing means 7 includes a pair of laterally spaced cheese cubing devices 12 and 13 which are operated in predetermined alternate relationship to provide a continuous supply of cheese cubes 8 through a pair of shredder units 14 and 15 located between the cubing devices 12 and 13. Each of the cubing devices 12 and 13 provides for feeding of the cheese cubes 8 to both of the shredder units 14 and 15 with the alternate operation of the cubing devices 12 and 13 ensuring a continuously supply of the cheese cubes to the shredder units 14 and 15 which, therefore, operate continuously. The cubing devices 12 and 13 are each similarly constructed and the shredder units 14 and 15 are also each similarly constructed and, consequently, only cubing devices 12 and shredder device 14 will be described in detail. The other devices 13 and 15 when referred to will have similar elements 1 distinguished from those of the devices 12 and 14 by corresponding primed numbers.

More particularly, the cubing device 12 includes an inclined cheese block conveyor 16 adapted to successively receive cheese blocks 6 at the loading or ground level. The conveyor 16 moves upwardly in a stepped manner through a cutting apparatus 17 secured to the upper end of the conveyor. The conveyors 16 and 16' and the cutters 17 and 17' are to connected to each other and to a similar L-shaped supporting framework to form a rigid, stable structure.

The L-shaped side framework generally includes a main vertical, channel support 18 with the upper end of conveyor 16 and the cutters 17 secured to the upper end thereof. An angled brace 19 is secured to the lower end of the flange 20 of the channel support 18 and projects forwardly beneath the conveyor 16. The opposite end is secured to a front vertical post support 21. The brace 19 is formed with a box cross section which is sealed at the opposite end to maintain a complete total enclosed member. The ends tightly abut the vertical members 18 and 21 and are welded as at 22 to positively ensure complete enclosure of the box-like member and to prevent the possibility of formation of a food trap. The support 18 and the post 21 are provided with adjustable leg means 23 for proper leveling of the total apparatus. The front posts 21 and 21' are joined to each other by a pair of vertically spaced cross braces 23a which are welded to the respective members at the entrance walls to once again maintain a complete enclosure with the elimination of food traps.

Conveyor 16 includes an inclined base member 24 which is formed of a box-like cross-section, as shown in FIG. 4 with sealed ends. Member 24 has a pair of stud-like members 24a welded to the upper end and abutting the channel 18. Suitable attachment bolts pass through the support 18 and into the members 24a. The lower end is attached by a bolt unit 24b which passes through the member 24 and into a threaded stud-like member on the post 21. Upper and lower belt support units 25 and 26 are secured to the opposite ends of member 24 with a slat belt 27 looped about the units 25 and 26 and mating with a sprocket 28 at the top. As shown most clearly in FIGS. 2 and 3, unit 25 includes supporting bars 29 secured to the opposite sidewalls of the base member 24. A suitable mounting plate 29a is secured to the inner end portion of the bar 29 and bolted in place. The outer end of bar 29 projects from the member 24 to define a guide within which drive sprocket 28 is located.

The sprocket 28 is coupled to a suitable hydraulic drive motor 30 which is secured to the outer wall of the support 18. The motor 30 is any suitable hydraulic-driven rotary motor to permit complete enclosure of the drive system. The hydraulic motor 30 is coupled to suitable supply and return lines 30a, not specifically described, shown secured to an upper support bracket spanning the two channel supports 18 and 18' and coupled to the respective motors through a control unit, not shown, which provides for selective supply and drain of hydraulic fluid to and from the motor in predetermined timed relationship. The motor 30 drives sprocket 28 to move conveyor chain belt 27 which is looped about the sprocket 28 and support unit 25 at the upper end and the lower support unit 26 at the lower end.

The conveyor belt 27, as most clearly shown in FIGS. 3 and 4, is formed from a plurality of laterally extending and pivotally interconnected flat rectangular slats 31. These several slats 31 are pivotally interconnected centrally of a long edge to the immediately adjacent slat by overlapping, downwardly depending hinge tube or barrels 32 joined by an interconnecting pivot pin 33. The slat edges are closely spaced and the hinge pin structure is located inwardly of the plane of the belt 27 and only in the central portion. The hinge structure is thus aligned with the member 24 and the upper run is supported thereon, as shown in FIG. 4. A plurality of conveyor flights shown as flat plates 34 are secured to and project perpendicular from spaced slats 31. In the illustrated embodiment of the invention, the several plates 34 are rigidly affixed to the slat by welding as at 35 to produce an integral structure. The plates 34 are spaced generally in accordance with the length of the cheese block 6 to establish a chamber or recess for each block between successive plates. As the conveyor belt 27 rotates, the cheese block moves upwardly into the cuber or cutter assembly 17. The belt 27 is driven by the depending hinge pin assemblies 32 – 33 mating with the drive sprocket 28 secured to the upper end of the base bar. The illustrated drive sprocket 28 is secured to the hydraulic motor 30 which is bolted to the exterior of the top vertical channel support 18 by a suitable mounting frame 36 with an appropriate opening for the drive connection. The lower end of the conveyor belt 27 passes over the lower sprocket assembly 26 including an idler sprocket 37. This assembly is illustrated secured inline with the base bar 24 by a suitable mounting plates 38 to opposite sides of bar 24. The adjustable mounting plates 38 having a plurality of longitudinally distributed slots 39 are secured by coupling bolts 40 to the sidewall of the member 24. The upper end of the coupling plates 38 include a flange 41 with an adjustable positioning bolt 42 threaded therethrough and moving into engagement with a laterally extending support bar 43 for the longitudinal positioning of the sprocket 37. A lower support bar 44 is secured to the underside of the plate to guide the chain belt.

The conveyor device 12 further includes vertically upstanding sidewalls 45 located to the opposite sides of the upper run of the belt 27 to confine and locate the cheese block 6 on the conveyor. In the illustrated embodiment of the invention the sidewalls 45 are integrally formed with an inwardly projected L-shaped mounting wall 46 which extends beneath the slats 31 to a depending mounting wall abutting the base bar or box 24, as most clearly shown in FIG. 4. The wall 46 is bolted in place by through bolts 47 which extend completely through the bar and are welded to close the opening from which they project as at 47a. The sidewall 46 is apertured to permit mounting onto the studs with suitable wing nuts or the like 48 provided for releasable mounting of the sidewalls. Thus, when it is desired to clean the assembly the sidewall 45 is readily removed to expose the slatted belt 27 and also give direct access to the adjacent belt support structure.

The lower end of the conveyor 16 is enclosed by a semicircular housing including a curved peripheral wall 49 and sidewalls 50 and 51 projecting forwardly therefrom to enclose the outermost end of the conveyor. The end cover is provided with a pair of supporting tube members 52 on the uppermost edge of the sidewalls which fit over supporting pins 53 on the upper corresponding edge of a confining sidewall 45. An inner sidewall enclosure or plate 54 closes the gap between the end cover sidewall 51 and the front vertical post 21. The plate 54 includes a mounting flange 55 provided with a plurality of vertically spaced key slots 56 releasably coupled to headed support pins on the post as at 57. The lower run of the conveyor 6 is also within a protective enclosure including removable inner and outer sidewalls 58 and 59. Both are generally rectangular covers which extend along the sides of the conveyors to the cutting device 17 and are similarly mounted in supporting edge recesses for ready release of the several components for complete cleaning of the assembly.

Referring particularly to FIGS. 2 and 3, the outer sidewall 59 is supported at the lower end by an internal pin 60 which mates with an opening in the locating lug on bar 43 on the side of member 24, and in a U-shaped, upwardly opening socket 60a secured to the lower corner of the end cover 59. The upper end is secured in a U-shaped lower end of a bracket 61 secured to a depending upper wall 63 of the cutting unit 14. The upper wall 63 projects upwardly from wall 59 into abutting relationship to the flange of the vertical support 18. Wall 63 is releasably secured in place to the support 18 by a tubular socket and pin unit 64 and maybe by a bolt and wing nut unit 64a to a short depending wall 62 secured to the base bar 24 as shown in FIG. 7. The inner sidewall 58 similarly releasably mounted in place with the upper end terminating within the lower end of the cutting device 17 and the lower end abutting the post 21 with a stabilizing socket unit 65.

The several sidewall members are releasably mounted and may be provided with handle members, not shown, for convenient removal and replacement. The sidewalls are formed of stainless steel or like material which is acceptable in food processing plants and is constructed of flat metal members which can be conveniently, totally cleaned by washing.

In the assembled relation as shown in FIGS. 1, 2 and 3, the conveyors 16 and 16' are driven with a stepped movement by time spaced energization of motors 30 and 30' with each of the conveying devices sequentially transferring the cheese blocks 6 upwardly into the cutting devices 17 and 17'.

Each of the cutting devices 17 and 17' is similarly constructed and device 17 is described. The cutting device 17 includes a housing 67 secured in overlying relationship to the upper end of conveyor 16 and extending laterally thereof, as shown most clearly in FIGS. 1, 2, 6 and 7. The housing 67 is open-ended with a discharge opening spaced inwardly between the two conveyors 16 and 16' in overlying relationship to the shredding devices 14 and 15. The cross-section of the housing 67 is slightly larger than the cheese block 6. A reciprocating wall member 68 is located within the housing 67 and is adapted to move across the conveyor 16 to push a cheese block 6 outwardly through the discharge opening which is provided with a cutting screen assembly 69 (FIGS. 6–8) to automatically sever the cheese block 6 into the plurality of small chunks or cubes 8. More particularly in the illustrated embodiment of the invention, the housing 67 generally includes an upper flat top wall overlying the complete cutting device 17 with front and back depending sidewalls secured to a partial flat bottom wall 70 on the inner end. Sidewalls 62 are integrally formed with or are otherwise secured to bottom wall 70 and depend from bottom wall 70 to the opposite sides of the base member 24. Securement bolts 70a pass through the sidewalls 62 and into mounting studs 70b welded to member 24 beneath the housing 67 and interconnected to the member 24 to define a telescoping support projecting downwardly over the conveyor 16 and releasably secured to the opposite upper sidewalls thereof. The leading or front wall of housing 67 includes an entrance opening 71 and the trailing or back wall includes an opening 71a through which the upper run of the conveyor 16 moves. The entrance opening may be provided with an upper entrance guide plate 72 to properly center and direct the cheese block 6 through the opening.

The partial bottom wall extends beneath the conveyor 16 with a bottom slot 73 to accommodate the hinge units and offset walls 73a defining supporting surfaces, generally in the same plane as the bottom surfaces of conveyor slats 31 to support the cheese block 6 as it is moved toward the discharge opening by the transfer plate or wall member 68.

The wall member 68 is shown as a plate generally slightly smaller than the rectangular cross-section of the housing. It is reciprocably mounted within the housing by a hydraulic cylinder unit 74 which may be of any conventional hydraulic construction adapted to maintain a completely sealed condition and with the power necessary to move the cheese block 6 forwardly and through the cutting element 69. A small guide element in the form of rectangular bar 74a is secured within the upper corner of housing 67 and mates with a cut out or notch in the member 68. The notch may be provided with a bearing surface by a plate 74b which is secured to the back side of member 68 and which is notched to overlap into the plate notch and engage the guide bar 74a.

Although element 69 may be any suitable cutting or cubing means, a simple, reliable structure includes a removable screen including a dividing wire member 75 located centrally of the depth of housing 67 and a plurality of laterally spaced, parallel wire members 76 mounted within a removably frame 77. The wire members 76 extend vertically and are laterally spaced to simultaneously sever the cheese blocks 6 on lines perpendicular to the cutting plane of the dividing wire 75. The basic cheese block 6 is divided into a plurality of relatively small cubes 8 having a length corresponding to the width of the original cheese block 6, a depth equal to approximately one-half of the original depth and a width equal to the subdivision defined by the plurality of the parallel wires 76.

In the illustrated embodiment of the invention, the element 69 is angularly oriented with respect to the conveyor 16, with the lower end spaced slightly forwardly of the adjacent side of the entrance opening and the upper end spaced significantly from the corresponding end of the conveyor and thus outwardly of the lower end, as most clearly shown in FIG. 6. As the cheese block 6 is moved forwardly, the lower end will move essentially completely through the element 69 while the upper end will be retained within the housing 67 and forced outwardly by the succeeding cheese block. This has been found to provide a very convenient and reliable means of producing the desired cube sizing.

The alternate automatic stepped operation of the two cutting devices 17 and 17' with the corresponding operation of the interrelated conveying devices 12 and 13 provides a continuous supply of cheese cubes 8 to the grating devices 14 and 15 and permits high speed continuous grating of cheese.

Figure 9:
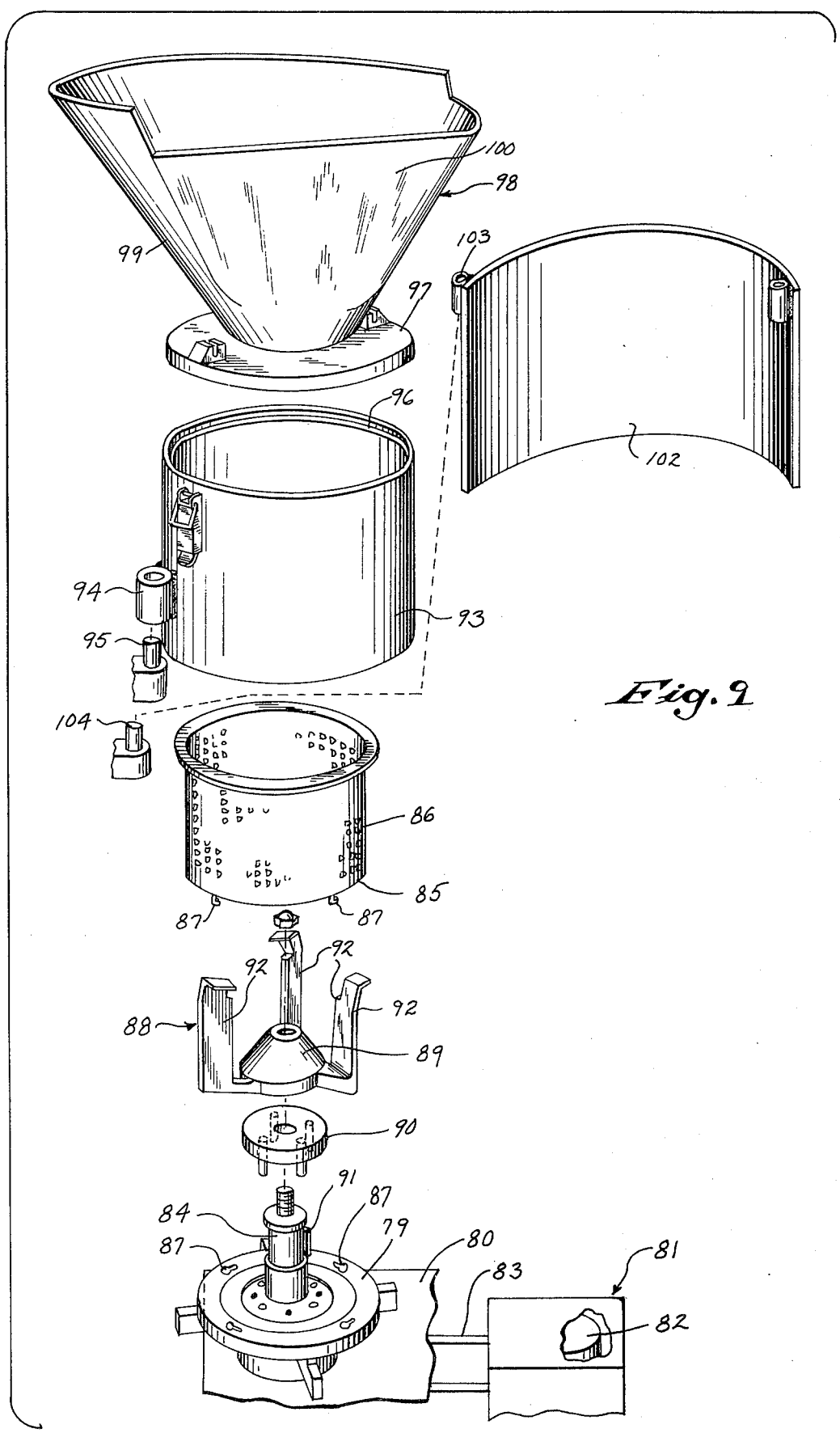
FIG. 9 is an exploded view of a shredder apparatus.

Although the grating devices may, within the broadest aspect of the invention, be of any suitable construction, Applicant has found that the grating construction, such as more clearly shown in FIGS. 2, 3 and 9, provides unusually satisfactory and practical construction. The devices are especially constructed to permit convenient cleaning of the apparatus. As each of the grating devices 14 and 15 is similarly constructed the forward device 14 is described in detail with the components of the alternate grating device identified by corresponding primed numbers where necessary for reference purposes.

Generally, the grating device 14 is mounted to one side of a cross-bracket 78 shown as a relatively large U-shaped channel set on its edge and secured at the opposite ends to the vertical channel supports 18. The cheese grater 14 includes a disc-like base 79 rotatably mounted in the upper wall of a housing 80 for a hydraulic-motor operated belt drive unit 81. A hydraulic motor 82 is located within housing 81 and coupled through a belt 83 to simultaneously rotate base 79 and input shaft 84 in opposite directions. Shaft 84 projects upwardly through the mounting base 79 and terminates in a threaded attachment end. A basket 85, has an apertured sidewall 86 having the conventional teardrop struck out shaped openings for shredding of products. Basket 85 is releasably secured upon the upper wall of the base 79 by suitable conventional releasably key-lock units 87 circumferentially distributed about the base and the bottom wall of the basket. The basket 85 opens upwardly, concentrically of shaft 84 and cutting and distributing member 88. The member 88 includes a central mounting hub 89 resting on a bearing member 90 located on the top wall of the base 79. The distributing member 88 is secured in place by a nut and a key-lock attachment 91 on the shaft 84. The distributing member includes three standing radially extended arms 92 which are bent over slightly at the upper end. The distributing arms 92 are strip-like members angularly oriented with respect to the periphery of the basket and located immediately adjacent thereto. Rotation of the member 88 causes the cheese cubes 8 to move outwardly into engagement with the apertured cutting edges in the basket to shred the cheese and move it outwardly of the basket. The cheese drops downwardly along the side of the basket and the outer edge of the disc for discharge beneath the basket upon the transfer conveyor. The basket 85, in turn, is totally enclosed by a tubular outer housing 93, which is releasably attached to the bracket 78. The housing 93 includes a pair of offset mounting hubs 94 welded or otherwise appropriately secured to the outer periphery of the housing. The hub 94 mates with stepped supporting pins 95 on the adjacent mounting bracket 78, to properly locate the housing in encircling relationship to the basket 85 and with the upper and lower ends located in slightly, outwardly spaced relationship to such a basket. The upper end is slightly recessed as at 96 to define a supporting ledge upon which the lower plate 97 of a feed funnel 98 is secured. The funnel 98 has an outer, upwardly extending conical wall 99 and an inner, generally flat wall 100 which also projects upwardly but terminates below the level of wall 99. The funnels 98 and 98' are mounted with the planar walls in opposed relation, as shown in FIG. 3, with the junction spaced below the discharge ends of the cutting devices 17 and 17'. The conical walls 99 and 99' extend upwardly to approximately the bottom wall of housing 67 and 67'. Thus wall 99 of the device 14 is relatively short as a result of the inclined arrangement of the conveyors and devices 17 and 17' while the wall 99' is relatively long. A divider 101 is pivotally secured to the corresponding connected edges of the two funnel walls to permit selective separation of the falling cheese cubes 8 to maintain an appropriate, essentially similar feed to both of the devices 14 and 15, or alternatively, if required, to permit the feeding to one or the other of the grating units as desired.

In addition to the above enclosure, a secondary outer cover or baffle 102 is secured in encircling relationship to the grating device and particular housing 93. The outer baffle 102 is generally a partial circular member adapted to encircle the housing 93 in slightly spaced relationship thereto and with its edges abutting the mounting bracket 78. The baffle 102 is provided with a pair of mounting hubs 103 welded or otherwise secured to the upper portion and adjacent the end edges. It is secured in place by dropping of the hubs 103 over appropriate mounting pins 104 provided on the mounting bracket 78 to support the baffle in a manner essentially corresponding to that of the mounting of the housing 93. This provides for a complete enclosure of the unit while permitting convenient and rapid disassembly of the grating device for cleaning purposes. Thus, it is merely necessary to lift and remove the outer baffle 102, disconnect the latch mechanism for convenient separation of funnel 98 and lift housing 93 to expose the basket 85 and the internal working mechanisms, all of which can be readily disassembled for thorough cleaning of all components. The several components are formed of stainless steel and the like, such that normal cleaning processes required in food production plants may be employed.

The hydraulic system for the several motors 30 and 82 and hydraulic units 75 may be supplied from any suitable high pressure pump means which can be operated from any suitable source. Normally, a sump return is provided with a pump means 105 to periodically pressurize the system. Applicant has found that a single small electric motor 106 has been employed as a sump return with a housing enclosure 107 provided to maintain the desired complete enclosure of the system. The housing is removably mounted, however, to permit access to the motor if required, for maintenance and the like.

In summary the grating or shredding devices 14 and 15 operate continuously. While the one conveyor 16 is moving a cheese block 6 upwardly into the associated cutter housing 67, the power cylinder unit 74' of unit 17' is activated to push the plate 68' and aligned cheese block 6 outwardly with block 6 passing through its cutting element 69' to form cubes 8. Plate 68' is retracted and the conveyor 16' operated while conveyor 16 stops and the plate 68 moves the aligned block 6 out. The device operates in continuous, alternate, synchronized sequence to maintain a continuous supply of cheese cubes 8 to the shredding devices 14 and 15.

The total assembly is provided with any suitable control means 32 which can be readily provided by those skilled in the art to maintain the desired interrelated stepped movement of the two conveyors 16 and 16' with movement of the cutting devices 17 and 17'. For example, the operation of a cutting device 17 or 17' could control both its own conveyor and the opposite cutting device. Once a cheese block has been properly aligned into the cutting device, the conveyor could automatically activate its cutting device to more forwardly to remove the cheese block and to simultaneously activate the opposite conveyor. An interlock from the opposite cutting device would prevent the last action until such cutting device had reset to the retracted position. At that time, the opposite conveyor would then move its cheese block upwardly into the associated housing and in response to proper location therein, and restarting the first conveyor, again in accordance with an interlock controlled by the proper retraction of the first cutting device. This would provide for a complete alternate sequential desired operation of the cutting devices to maintain the continuous cheese cube supply.

As previously noted the various elements of the apparatus including the supports, covers and operating components are formed of stainless steel or other similar material which is acceptable for food processing machinery. The several connecting and supporting elements are welded to the adjacent support members to eliminate openings and the like which could form food traps within the apparatus. This construction particularly with the use of closed hydraulically operated motors and drive means thus permits maintaining of the necessary high standards of cleanliness essential to a practical food processing apparatus without unnecessary and impractical cleaning processes.

The hydraulic drive system also permits the necessary precise interrelationship of the system operation while permitting convenient and thorough cleansing of the assembly. The present invention thus provides a practical bulk food severing apparatus and particularly a cheese cutter for rapidly producing large quantities of grated or shredded cheese.

Various modes of carrying out the invention are contemplated as being within the scope of the following claims, particularly pointing out and distinctly claiming the subject matter which is regarded as the invention.

I claim:

1. In a food cutting device for cutting food blocks and supplying of food chunks to a processing apparatus, an inclined conveyor means adapted to receive a plurality of said food blocks and to sequentially transport said blocks upwardly, a cutting device secured to the upper end of said conveyor including means to move each of said blocks laterally through a cutting means to separate said food block into a plurality of small chunks, a processing means located adjacent to and below said cutting device and adapted to receive the cut food from said cutting device, means to activate said conveyor and said cutting device to alternately operate, and said conveyor means, cutting device and processing means being formed of removable outer enclosure means to expose the internal working components for cleaning.

2. The apparatus of claim 1 wherein said conveyor means includes a belt support and conveyor belt mechanism rotatably mounted on the support and outer housing sidewall means having a plurality of removable walls to completely expose the conveyor belt mechanism for direct cleaning thereof.

3. The cutting apparatus of claim 1 wherein said food conveyor means including a plurality of adjacent interconnected slats to form a supporting belt and having a plurality of plates secured to the slats in longitudinally spaced relation and projecting perpendicular to said slats, said plates being spaced slightly in excess of the maximum length of the food blocks to define a supporting recess within which the blocks are located along the upper flight of the belt, a supporting framework including a box-like frame member secured at the upper and lower ends in fixed relationship within the framework, said belt being rotatably mounted upon said frame member, a pair of conveyor sidewall members releasably secured to the opposite sides of said frame member, said sidewalls including a supporting wall located immediately beneath the slats and extending perpendicularly outwardly to upwardly extending sidewalls spaced slightly from the adjacent edges of the slats, and a pair of releasably mounted outer sidewall members depending downwardly beneath the frame member.

4. The apparatus of claim 3 including a lower cup-shaped housing having a curved periphery and a pair of forwardly projecting sidewalls located in telescoping relationship over the lower end of the belt and the frame member, said cover having edges located adjacent to the lower end of said sidewalls, a pin and slot connection means having releasable, cooperating elements secured respectively to the sidewall and to the cover to permit the dropping of the cover into supporting relationship on the adjacent conveyor sidewall members.

5. The apparatus of claim 3 wherein said cutting device includes a housing secured in fixed relationship to said conveyor means and having an entrance and exit opening aligned with said conveyor belt, said opening projecting upwardly generally normal to the belt beyond the plates to receive a food block, said housing having a length generally corresponding to the spacing of said plates to accommodate a complete food block, said housing extending laterally from the belt to a side discharge opening and including a bottom supporting wall projecting laterally from the belt, a laterally moving discharge member located within the housing outwardly of the conveyor belt and reciprocably mounted to move across said belt for forcing of a food block from the belt onto and across said supporting wall, and a cutting means secured across the discharge opening of said housing.

6. The apparatus of claim 5 wherein said cutting means includes a plurality of parallel wire members located essentially normal to the plane of the supporting wall and a second wire member extended normal to the first cutting wire members and generally centrally thereof.

7. The apparatus of claim 5 wherein said discharge opening is angular with respect to the laterally moving discharge member to create a successive feeding of cheese to said processing means.

8. The apparatus of claim 5 wherein said processing means includes a shredding means for shredding of the food chunks.

9. The apparatus of claim 5 including a hydraulic motor coupled to actuate the conveyor and a hydraulic piston cylinder unit coupled to position the discharge member.

10. The apparatus of claim 5 wherein said food processing means includes a fixed mounting bracket, a food shredder having a rotating basket with an outer apertured sidewall, oppositely rotating feeder arms mounted within the basket, an outer tubular housing encircling said rotating basket, mounting means having releasable members secured respectively to the outer periphery of the outer housing and to the adjacent mounting bracket whereby said housing is secured in place by lowering thereof until the mounting means engage, a partial encircling second housing having end edges abutting the bracket and extending about the tubular housing, and a mounting means having releasable members secured adjacent to the edges of the second housing and to the bracket.

11. In a food shredding device for supplying of shredded food to a crust-like member, a pair of inclined conveyors each adapted to sequentially receive a plurality of food blocks, cutting devices secured to the upper end of said conveyors with opposed discharge openings and each adapted to separate said blocks into a plurality of small cubes, shredding means located between two cutting devices and adapted to receive the cubed food from both of said cutting devices, and means to activate said conveyors and said cutting devices and to sequentially actuate the first conveyor and a second cutting device and then the second conveyor and the first cutting device to thereby maintain a continuous supply of food cubes to the shredding means.

12. The apparatus of claim 11 wherein said conveyors each include a framework having mounting members welded to tubular frame members to seal all openings to said tubular frame members and having outer enclosing wall means consisting of a plurality of corrosion resistant removable walls to cover the conveyor operating mechanism and to provide convenient access for cleaning thereof.

13. The apparatus of claim 12 including a hydraulic motor means for each of said conveyors and for each of said cutting devices and for said shredding means.

14. The apparatus of claim 11 wherein each of said inclined conveyors includes a plurality of adjacent slats pivotally interconnected to form a flat supporting belt and having a plurality of normal support members secured to the slats in longitudinally spaced relation slightly in excess of the maximum length of a food block to define recess within which the blocks are located along the upper run of the belt,
- a supporting framework including a conveyor frame member secured at the upper and lower ends in fixed relationship, a drive and guide unit secured to the one end of the frame member and a guide unit located to the opposite end of the frame member, said supporting belt being looped about said frame member in engagement with said drive and guide units for continuous recirculating inclined movement.

15. The apparatus of claim 14 including a pair of conveyor sidewall members releasably secured to the opposite sides of said frame member, said sidewall members including a supporting wall located immediately beneath the belt slats and an outer wall extending perpendicularly, upwardly spaced slightly from the adjacent edges of the slats,
- a lower cup-shaped housing having a curved periphery and a pair of forwardly projecting sidewalls located in telescoping relationship over the lower end of the belt and the lower guide unit, said cover having edges located immediately adjacent to the lower end of said sidewalls, a pin and socket connection means having releasable, cooperating elements secured respectively to the adjacent sidewall and to the cover to permit the dropping of the cover into supporting relationship on the adjacent sidewalls, and a pair of outer sidewalls extending from said lower cover upwardly parallel to the conveyor, mounting means on the frame and first named outer sidewalls for releasably supporting said outer sidewalls and permitting removal thereof by merely lifting of the outer sidewalls from the assembled position.

16. The apparatus of claim 11 wherein each of said cutting devices includes a housing secured in fixed relationship to the upper end of said conveyor and having entrance and exit openings aligned with said conveyor for passing of the food blocks therethrough, said housing including a product support wall projecting inwardly toward the opposite cutting device and defining a planar support generally adjacent to the plane of the conveyor to the discharge opening, a pusher plate member located within the housing laterally, outwardly of the conveyor and reciprocably mounted to move across said conveyor for forcing of a block from the conveyor onto and across said product support wall to the discharge opening, food severing means secured across the discharge opening of said housing.

17. The apparatus of claim 16 wherein said severing means includes a plurality of parallel wire members located essentially normal to the plane of the product supporting wall and a further wire-like member normal to the first cutting wire members and located generally centrally thereof.

18. The apparatus of claim 11 wherein said shredding means includes a support plate and a rotating basket having an apertured bladed sidewall and a plurality of oppositely rotating shredding feeding arms located within the basket, a supporting bracket, an outer housing enclosing said basket, a pin and socket mounting means having releasable members secured respectively to the outer periphery of the outer housing and to the adjacent bracket whereby said housing is secured in place by lowering thereof until the releasable members of the mounting means engage,
- and an outer baffle encircling said outer housing, releasable pin and socket means releasably securing said baffle to said bracket.

19. The apparatus of claim 18 wherein said outer housing is a tubular housing and having a funnel support means provided on the upper wall of said tubular housing, a funnel member resting on said tubular housing and having a generally conically shaped wall portion projecting upwardly into overlapping relationship with the adjacent cutting devices.

20. The apparatus of claim 19 wherein said conveyors and said cutting devices and said shredding means are formed of a corrosion-resistant metal permitting direct washing and cleaning of the components, and said conveyors, cutting devices and shredding means are operated by sealed hydraulic motor means.

21. The apparatus of claim 11 wherein each conveyor includes a plurality of adjacent slats interconnected to form a flat supporting belt and having a plurality of plates secured to the slats in longitudinally spaced relation and projecting perpendicular to said slats, said plates being spaced slightly in excess of the maximum length of a block to define a supporting recess within which the blocks are located along the upper flight of the belt,
- a supporting framework including a box-like frame member secured at the upper and lower ends in fixed relationship within the framework, a sprocket drive unit secured to the upper end of the frame member and a lower sprocket idler unit adjustably secured to the lower end of the frame member, said supporting belt being looped about said sprocket drive unit and said idler unit for continuous recirculating inclined movement.
- a pair of conveyor sidewall members releasably secured to the opposite sides of said bar, said sidewalls including a supporting wall located immediately beneath the slats and extending perpendicularly upwardly adjacent the edges of the slats,
- a lower cup-shaped housing having a curved periphery and a pair of forwardly projecting sidewalls located in telescoping relationship over the lower end of the belt and the lower sprocket assembly, said cover having edges located immediately adjacent to the lower end of said sidewalls, a pin and socket connection means having releasable, cooperating elements secured respectively to the sidewall and to the cover to permit the dropping of the cover into supporting relationship on the adjacent sidewalls, a pair of outer sidewalls extending from said lower cover upwardly parallel to the conveyor, releasable socket mounting means on the outer sidewalls and frame member and permitting removal thereof by merely lifting of the outer sidewalls from the assembled position.

22. The apparatus of claim 21 wherein each of said cutting devices includes a housing secured in fixed relationship to said frame member and having an entrance and exit opening aligned with said conveyor belt, said opening projecting upwardly generally normal to the belt beyond the plates to receive a food block, said housing having a length approximately equal to the spacing of said plates to accommodate a complete food block, said housing including a support wall projecting laterally from the opposite sides of the belt and defining a planar support wall generally adjacent to the plane of the belt, a plate member located within the housing outwardly of the conveyor belt and reciprocably mounted to move across said belt for forcing of a food block from the belt onto and across said supporting surface, a removable severing means secured across the discharge opening of said housing and including a frame with a plurality of parallel wires longitudinally spaced along the opening and located essentially normal to the plane of the support wall and a lateral wire located centrally of said parallel wires, said wires being soldered within said frame to eliminate all voids at said frame.

23. The apparatus of claim 22 wherein said shredding means includes a pair of shredders located between said cutting devices to simultaneously receive cubes from the cutting devices, each of said shredders including a hydraulic drive means mounted in fixed relation beneath said cutting devices, a drive disc and a coaxial drive shaft projecting upwardly from the disc, cutter arms secured to the drive shaft, a cutting basket releasably secured to the disc coaxially of said shaft, an outer tubular housing enclosing said cutting basket, a bracket secured to the framework between said shredders, a pin and socket mounting means having releasable members secured respectively to the outer periphery of the outer housing and to the adjacent housing bracket whereby said housing is secured in place by lowering thereof until the releasable members of the mounting means engage, a funnel support means provided on the upper wall of said tubular housing, a funnel member resting on said tubular housing and having a generally conically shaped wall portion projecting upwardly into overlapping relationship with the adjacent cutting device and having an inner central planar wall terminating below the cutting device with adjacent planar edges, said planar walls of said funnel devices being immediately adjacent to each other, a dividing member secured to said adjacent planar edges and projecting outwardly to selectively divert the food cubes from the cutting devices into the respective funnels, an outer baffle plate encircling said outer housing, releasable pin and cylinder means releasably securing of said baffle to said bracket.

24. The apparatus of claim 23 wherein said conveyors and said cutting devices and said shredders are formed of a corrosion-resistant metal permitting direct washing and cleaning of the components, and hydraulic motor means operate said conveyors, said cutting devices and said shredders to maintain a continuous supply of cubes to said shredders.

* * * * *

UNITED STATES PATENT AND TRADEMARK OFFICE
CERTIFICATE OF CORRECTION

PATENT NO. : 3,980,235        Page 1
DATED : September 14, 1976
INVENTOR(S) : Harvey G. Kuhlman It is certified that error appears in the above-identified patent and that said Letters Patent are hereby corrected as shown below:

| | | |
|---|---|---|
| Column 2, Line 44, | after "vertical" insert---wires---; |
| Column 3, Line 20, | after "releasable" cancel "hing-type" and insert---hinge-type---; |
| Column 3, Line 41, | after "the" cancel "cube cheesing" and insert---cheese cubing---; |
| Column 4, Line 48, | after "are" delete "to"; |
| Column 6, Line 1, | after "by" delete---a---; |
| Column 8, Line 12, | after "a" delete "removably" and insert---removable---; |
| Column 9, Line 1, | after "conventional" delete "releasably" and insert---releasable---; |
| Column 10, Lines 43-44, | after "cutting device to" cancel "more" and insert---move---; |
| Column 14 Line 43, | after "movement" cancel ". (period)" and insert---, (comma)---; |

Signed and Sealed this

Third Day of May 1977

[SEAL]

Attest:

RUTH C. MASON
*Attesting Officer*

C. MARSHALL DANN
*Commissioner of Patents and Trademarks*